United States Patent
Berger et al.

(10) Patent No.: US 11,941,767 B2
(45) Date of Patent: Mar. 26, 2024

(54) AR-BASED CONNECTED PORTAL SHOPPING

(71) Applicant: Snap Inc., Santa Monica, CA (US)

(72) Inventors: Itamar Berger, Hod Hasharon (IL); Amar Boghani, Los Angeles, CA (US); Maria Jose Garcia Sopo, London (GB); Isac Andreas Müller Sandvik, London (GB); Qi Pan, London (GB); Matan Zohar, Rishon LeZion (IL)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/119,433

(22) Filed: Mar. 9, 2023

(65) Prior Publication Data

US 2023/0215116 A1    Jul. 6, 2023

Related U.S. Application Data

(63) Continuation of application No. 17/324,344, filed on May 19, 2021, now Pat. No. 11,636,654.

(51) Int. Cl.
    *G06T 19/00*         (2011.01)
    *G06K 7/14*          (2006.01)
                  (Continued)

(52) U.S. Cl.
    CPC .......... *G06T 19/006* (2013.01); *G06K 7/1413* (2013.01); *G06Q 10/087* (2013.01);
                  (Continued)

(58) Field of Classification Search
None
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |
| | (Continued) | |

FOREIGN PATENT DOCUMENTS

| | | |
|---|---|---|
| CN | 109863532 A | 6/2019 |
| CN | 110168478 A | 8/2019 |
| | (Continued) | |

OTHER PUBLICATIONS

"U.S. Appl. No. 17/324,332, Non Final Office Action dated Apr. 17, 2023", 33 pgs.

(Continued)

*Primary Examiner* — Ryan M Gray
(74) *Attorney, Agent, or Firm* — SCHWEGMAN LUNDERBG & WOESSNER, P.A.

(57) ABSTRACT

Aspects of the present disclosure involve a system comprising a computer-readable storage medium storing a program and a method for performing operations comprising: receiving a request from a client device of a first user to engage in a shared augmented reality (AR) shopping experience with a second user; generating, for display on respective client devices of the first and second users, the shared AR shopping experience comprising a plurality of AR items that represent real-world products overlaid on a shared real-world environment of the first and second users; determining that the second user is interacting with a first AR item of the plurality of AR items; and in response to detecting that the second user is depicted in an image captured by the client device of the first user, overlaying the first AR item on the second user in the image.

20 Claims, 13 Drawing Sheets

(51) Int. Cl.
  *G06Q 10/087* (2023.01)
  *G06Q 20/12* (2012.01)
  *G06Q 30/0601* (2023.01)
  *G06Q 50/00* (2012.01)
  *H04L 51/046* (2022.01)
  *H04L 67/131* (2022.01)

(52) U.S. Cl.
  CPC ..... *G06Q 30/0623* (2013.01); *G06Q 30/0643* (2013.01); *G06Q 50/01* (2013.01); *H04L 51/046* (2013.01); *H04L 67/131* (2022.05); *G06Q 20/1235* (2013.01); *G06Q 30/0633* (2013.01)

(56) References Cited

U.S. PATENT DOCUMENTS

| | | |
|---|---|---|
| 5,880,731 A | 3/1999 | Liles et al. |
| 6,023,270 A | 2/2000 | Brush et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,685,023 B1 | 3/2010 | Abraham et al. |
| 7,720,687 B2 | 5/2010 | Jung et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,326,704 B2 | 12/2012 | Glazer et al. |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,304,227 B2 | 5/2019 | Colbert |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,068,971 B1 | 7/2021 | Kantamneni et al. |
| 11,069,103 B1 | 7/2021 | Blackstock et al. |
| 11,080,917 B2 | 8/2021 | Monroy-hernández et al. |

(56) References Cited

U.S. PATENT DOCUMENTS

| | | | |
|---|---|---|---|
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernéndez et al. |
| 11,284,144 B2 | 3/2022 | Kotsopoulos et al. |
| 11,405,435 B1 | 8/2022 | Morales et al. |
| 11,580,592 B2 | 2/2023 | Berger et al. |
| 11,636,654 B2 * | 4/2023 | Berger ............... G06K 7/1413 |
| | | 345/633 |
| 2002/0067362 A1 | 6/2002 | Agostino Nocera et al. |
| 2002/0169644 A1 | 11/2002 | Greene |
| 2004/0044589 A1 | 3/2004 | Inoue et al. |
| 2005/0027612 A1 * | 2/2005 | Walker ............... G06Q 30/06 |
| | | 705/26.7 |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0100705 A1 | 5/2007 | Chen |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0030660 A1 | 2/2010 | Edwards |
| 2010/0115426 A1 | 5/2010 | Liu et al. |
| 2010/0149093 A1 | 6/2010 | Edwards |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0078052 A1 | 3/2011 | Ciptawilangga |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0208619 A1 | 8/2011 | Siounis et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0106910 A1 | 5/2013 | Sacco et al. |
| 2013/0201187 A1 | 8/2013 | Tong et al. |
| 2013/0215116 A1 | 8/2013 | Siddique et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0100997 A1 | 4/2014 | Mayerle et al. |
| 2014/0108530 A1 | 4/2014 | Papakipos et al. |
| 2014/0125678 A1 | 5/2014 | Wang et al. |
| 2014/0129343 A1 | 5/2014 | Finster et al. |
| 2014/0129393 A1 | 5/2014 | Soon-Shiong |
| 2014/0168477 A1 * | 6/2014 | David ............... G06Q 30/0621 |
| | | 348/441 |
| 2014/0214629 A1 | 7/2014 | Azam et al. |
| 2014/0222627 A1 | 8/2014 | Kukreja et al. |
| 2015/0206349 A1 | 7/2015 | Rosenthal et al. |
| 2016/0134840 A1 | 5/2016 | Mcculloch |
| 2016/0189431 A1 | 6/2016 | Ueda et al. |
| 2016/0210602 A1 | 7/2016 | Siddique et al. |
| 2016/0234149 A1 | 8/2016 | Tsuda et al. |
| 2016/0300387 A1 | 10/2016 | Ziman |
| 2017/0018024 A1 | 1/2017 | Xu et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0182024 A1 | 6/2018 | Nickerson et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0019242 A1 | 1/2019 | Bajpai et al. |
| 2019/0057616 A1 | 2/2019 | Cohen et al. |
| 2019/0097958 A1 | 3/2019 | Collet et al. |
| 2019/0108578 A1 | 4/2019 | Spivack et al. |
| 2019/0130649 A1 * | 5/2019 | O'Brien ............... G06F 30/00 |
| 2019/0188920 A1 | 6/2019 | Mcphee et al. |
| 2019/0280997 A1 | 9/2019 | Baldwin et al. |
| 2019/0325498 A1 * | 10/2019 | Clark ............... G06Q 30/0625 |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0174421 A1 * | 6/2021 | Nagar ............... G06V 40/20 |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0248338 A1 | 8/2021 | Spivack et al. |
| 2021/0266277 A1 | 8/2021 | Allen et al. |
| 2021/0279695 A1 | 9/2021 | Rice |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0028108 A1 | 1/2022 | Haapoja et al. |
| 2022/0030197 A1 | 1/2022 | Ishimoto |
| 2022/0132267 A1 | 4/2022 | Contreras |
| 2022/0261881 A1 | 8/2022 | Aslam et al. |
| 2022/0261882 A1 | 8/2022 | Youb et al. |
| 2022/0327747 A1 * | 10/2022 | Suzuki ............... G06Q 30/06 |
| 2022/0374968 A1 | 11/2022 | Berger et al. |
| 2022/0374969 A1 | 11/2022 | Berger et al. |
| 2022/0375169 A1 | 11/2022 | Berger et al. |
| 2023/0186377 A1 | 6/2023 | Berger et al. |
| 2023/0267532 A1 * | 8/2023 | Louder ............... G06Q 30/0641 |
| | | 705/26.8 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |

(56) References Cited

FOREIGN PATENT DOCUMENTS

| WO | WO-2012139276 A1 | 10/2012 |
| --- | --- | --- |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2016191685 A1 | 12/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | 2019189896 | 10/2019 |
| WO | WO-2020092900 A2 | 5/2020 |
| WO | 2022246422 | 11/2022 |
| WO | 2022246425 | 11/2022 |
| WO | 2022246426 | 11/2022 |
| WO | WO-2022246422 A1 | 11/2022 |
| WO | WO-2022246425 A1 | 11/2022 |
| WO | WO-2022246426 A1 | 11/2022 |

OTHER PUBLICATIONS

"U.S. Appl. No. 17/324,332, Response filed Jul. 12, 2023 to Non Final Office Action dated Apr. 17, 2023", 10 pgs.

"U.S. Appl. No. 17/324,344, Non Final Office Action dated Sep. 2, 2022", 22 pgs.

"U.S. Appl. No. 17/324,344, Notice of Allowance dated Dec. 21, 2022", 7 pgs.

"U.S. Appl. No. 17/324,344, Response filed Dec. 1, 2022 to Non Final Office Action dated Sep. 2, 2022", 10 pgs.

"U.S. Appl. No. 17/324,350, Notice of Allowance dated Jun. 30, 2022", 8 pgs.

"U.S. Appl. No. 17/324,350, Notice of Allowance dated Oct. 18, 2022", 8 pgs.

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-us/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"International Application Serial No. PCT/US2022/072402, International Search Report dated Sep. 6, 2022", 4 pgs.

"International Application Serial No. PCT/US2022/072402, Written Opinion dated Sep. 6, 2022", 6 pgs.

"International Application Serial No. PCT/US2022/072405, International Search Report dated Sep. 6, 2022", 4 pgs.

"International Application Serial No. PCT/US2022/072405, Written Opinion dated Sep. 6, 2022", 6 pgs.

"International Application Serial No. PCT/US2022/072406, International Search Report dated Sep. 9, 2022", 4 pgs.

"International Application Serial No. PCT/US2022/072406, Written Opinion dated Sep. 9, 2022", 7 pgs.

"Manage Your Bitmoji", Snapchat Support, [Online] Retrieved from the Internet: <URL: https://web.archive.org/web/20190503063620/https://support.snapchat.com/en-us/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

Wang, Chao, et al., "ARShop: A Cloud-based Augmented Reality System for Shopping", Proceedings of the VLDB Endowment, vol. 10, No. 12, (2017), 1845-1848.

"U.S. Appl. No. 18/097,619, Notice of Allowance dated Sep. 13, 2023", 11 pgs.

\* cited by examiner

US 11,941,767 B2

1

AR-BASED CONNECTED PORTAL SHOPPING

PRIORITY CLAIM

This application is a continuation of U.S. patent application Ser. No. 17/324,344, filed on May 19, 2022, which is hereby incorporated by reference in its entirety.

TECHNICAL FIELD

The present disclosure relates generally to providing augmented reality (AR)/virtual reality (VR) experiences using a messaging application.

BACKGROUND

Augmented-Reality is a modification of a virtual environment. For example, in Virtual Reality, a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
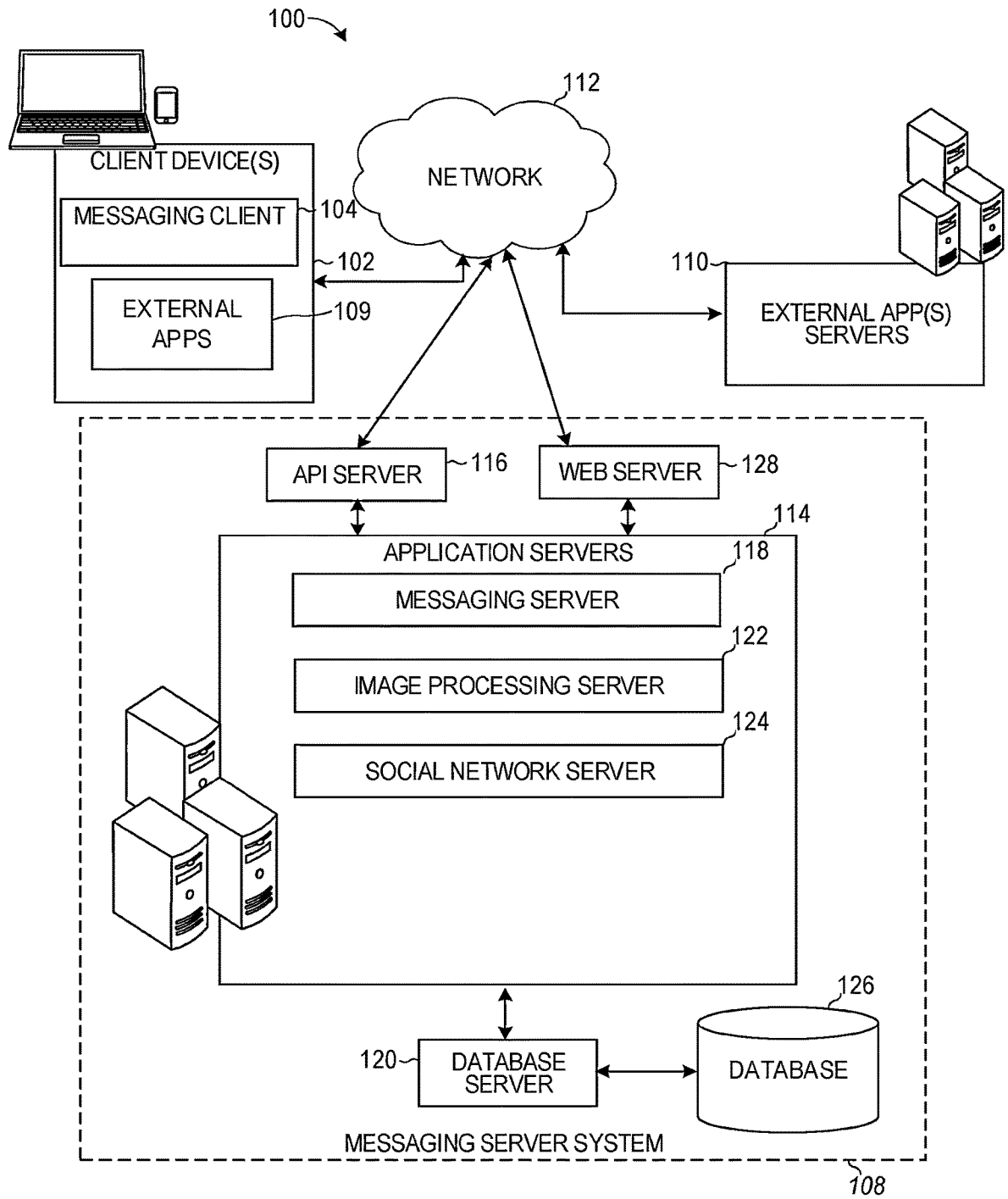
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, virtual reality (VR) and augmented reality (AR) shopping systems allow users to browse virtual products in the comfort of their own home. These systems allow a user to preview how a physical item looks on the user which simplifies the purchasing process. Such systems, though, are individual user-based and do not provide a way for users to share the shopping experiences virtually. In order to get feedback from the user's friends on products of interest, the user has to navigate the virtual store by themselves, select an item of interest and then send that item to their friends for feedback. Such feedback may take time to receive, and the lack of real time communications about the items being browsed typically causes purchase opportunities to be missed. While these systems generally work well, the manual and individual nature of the shopping experiences they provide takes away from the overall appeal. Specifically, the user of these systems has to spend a great deal of effort searching through and navigating multiple user interfaces and pages of information to identify an item of interest and then has to share that item with their friend which takes even more time. These tasks can be daunting and time consuming which detracts from the overall interest of using these systems and results in wasted resources.

The disclosed techniques improve the efficiency of using an electronic device which implements or otherwise accesses an AR/VR system by providing a shared AR/VR shopping experience in which multiple users can interact with each other in a virtual world to shop for products, such as for the users to purchase corresponding physical or electronically consumable items (e.g., clothing, accessories, makeup, toys, video items, music items, or video game items). Because the users interact with each other in the shared AR/VR shopping experience, they can receive and provide real-time feedback and improve the overall shopping experience. This avoids missed shopping and purchase opportunities and increases the overall appeal of online shopping.

Specifically, the disclosed techniques receive a request from a first user to engage in a shared augmented reality (AR) shopping experience with a second user. The disclosed embodiments generate, for display on respective client devices of the first and second users, the shared AR shopping experience in which a plurality of AR items that represent real-world products are overlaid on a shared real-world environment of the first and second users. The disclosed embodiments determine that the second user is interacting with a first AR item of the plurality of AR items and, in response to determining that the second user is depicted in an image captured by the client device of the first user, overlay the first AR item on the second user in the image. This improves the overall experience of the user in using the electronic device and reduces the overall amount of system resources needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party (also referred to as "external") applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
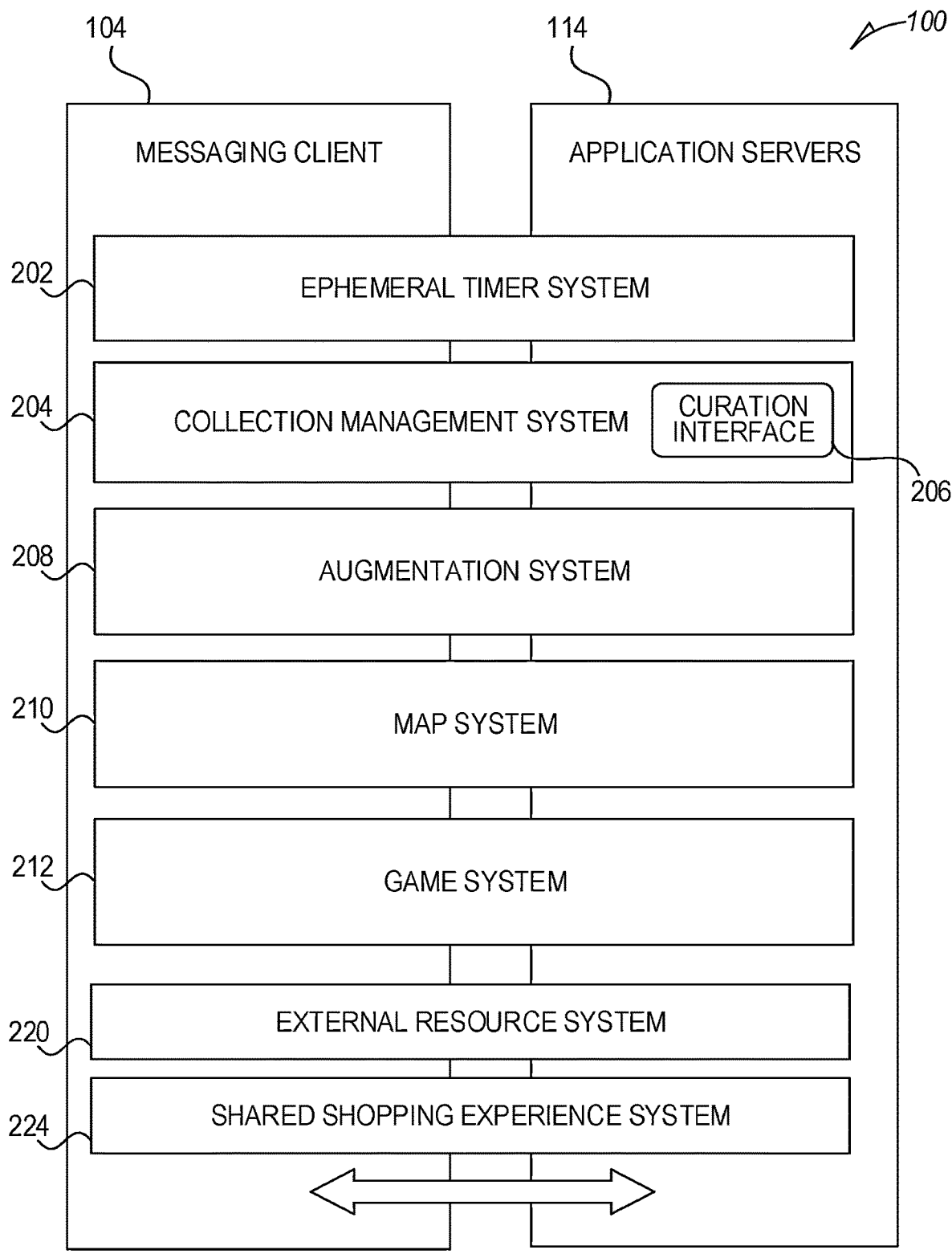
FIG. 2 is a diagrammatic representation of a messaging client application, in accordance with some examples.

Image processing server 122 is used to implement scan functionality of the augmentation system 208 (FIG. 2). Scan functionality includes activating and providing one or more augmented-reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., launching a shared shopping experience with one or more friends/users, as discussed in connection with FIGS. 5-10 below).

In some examples, a client device 102 of a first user can generate and display a barcode associated with the shared shopping experience. One or more other users or friends of the first user can join in and engage in the shared shopping experience with the first user by using their respective client devices 102 to capture or scan the image of the barcode that is displayed on the client device 102 of the first user. In some examples, the barcode can be placed physically on a surface of a real-world object (e.g., such as a store shelf, a store entrance, a hidden location, a wall, a ceiling, a floor, or other physical location), such as in a store or other real-world environment. Different users or friends can join in and engage in the shared shopping experience together by using their respective client devices 102 to capture or scan the image of the barcode that is physically placed on the surface of the real-world object. In some examples, the barcode can be privatized or associated with a password, login credentials, or a specified group of users. Namely, the client device 102 of a first user can generate a barcode and associate some restrictions with the barcode, such as a preselected group of friends or users who are allowed to engage in the shared shopping experience with the first user. After generating the barcode, the client device 102 can store the barcode along with the restrictions locally or on a remote server.

When the barcode is scanned by a client device 102 of another user, a link associated with the barcode is retrieved and accessed by the client device 102 of the other user. The client device 102 of the other user also provides a user identifier to the server associated with the link. The server determines that the user identifier matches or satisfies the restrictions associated with the barcode (e.g., the user identifier matches a user identifier associated with the barcode specified by the first user). In response, the server authorizes the client device 102 of the other user to join in on the same AR session of the shopping experience of the first user. In this way, the first user and the other user can interact with each other virtually and in AR to browse a virtual store, such as to try on different AR items (e.g., AR clothing or makeup). In response to determining that the user identifier fails to match or satisfy the restrictions associated with the barcode, the server prevents the client device 102 of the other user from accessing or joining the same AR session of the shopping experience of the first user.

Figure 3:
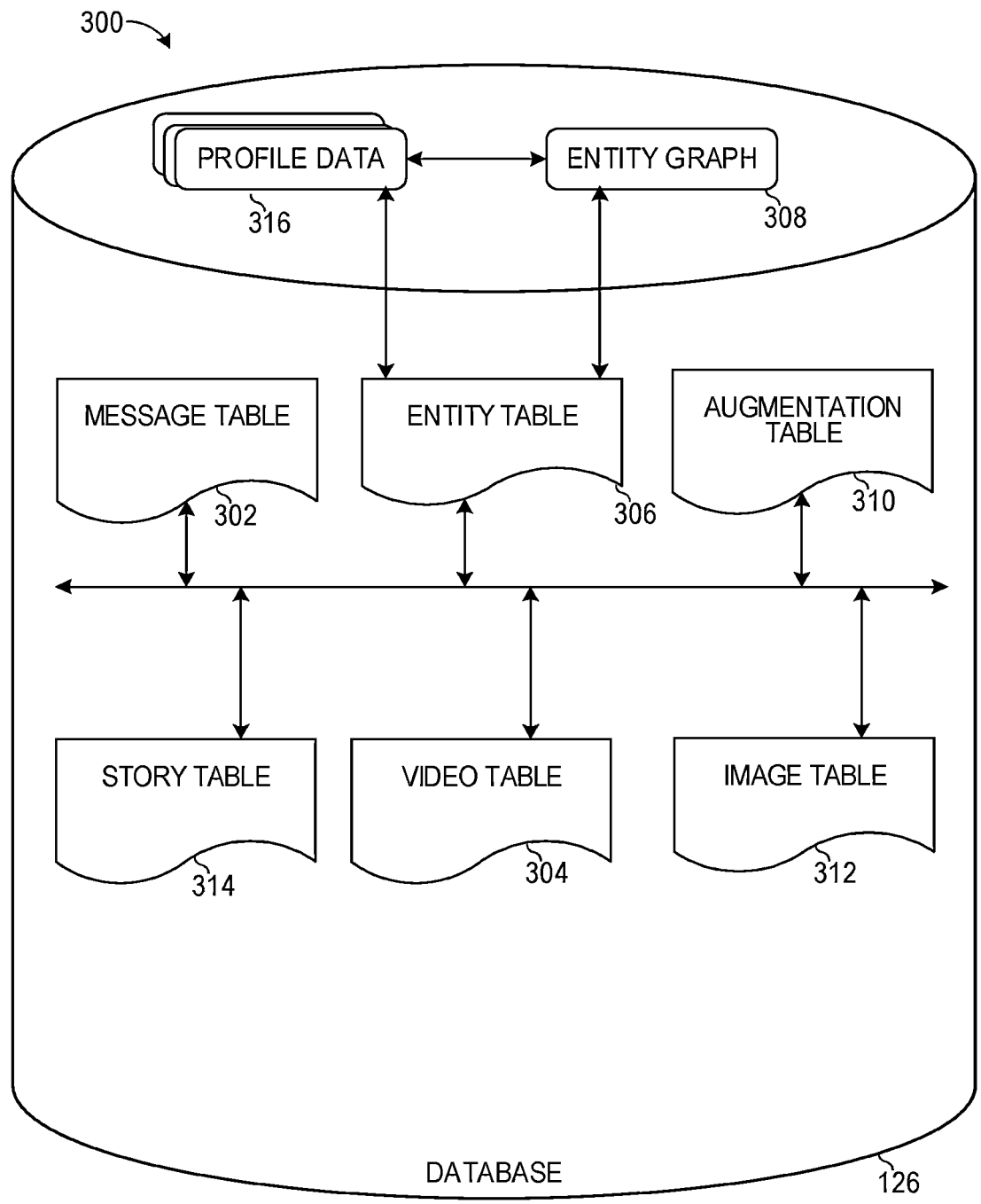
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display)

to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session, such as in a shared AR shopping experience. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 and/or the shared shopping experience system 224 to establish individual or shared AR/VR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR/VR session. In one example, the client devices 102 first gain access to the electronic group communication session and then obtain the session identifier in the electronic group communication session that allows the client devices 102 to access to the shared AR/VR session. In some examples, the client devices 102 are able to access the shared AR/VR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource (apps) servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The shared shopping experience system 224 provides a virtual AR storefront for multiple users to browse and shop for products virtually in AR together. In particular, the shared shopping experience system 224 can provide a shared shopping experience associated with a particular merchant or store. The shared shopping experience system 224 generates an option for a user to join or engage in a shared shopping experience. In response to receiving a user selection of the option from a client device 102, the shared shopping experience system 224 presents a screen that allows the user to invite one or more friends to join the user in the shared shopping experience. Input can be received from the client device 102 of the user that identifies one or more other users or friends of the user on the messaging client 104. In response, the shared shopping experience system 224 transmits a communication to the identified friends allowing the friends to launch and join the shared shopping experience with the user.

In some examples, in response to receiving a user selection of the option from a client device 102 to engage in the shared shopping experience, the shared shopping experience system 224 presents a screen that allows the user to select the types of AR items to include in the shared shopping experience. For example, the shared shopping experience system 224 can identify one or more real-world objects in a camera feed of the client device 102 of the user. The shared shopping experience system 224 identifies a list of different types of real-world products that are compatible and that can be displayed over the one or more real-world objects. The shared shopping experience system 224 generates a list of the different types of real-world products (e.g., makeup, pants, shirts, jewelry, and so forth). The shared shopping experience system 224 receives a user selection of one or more of the different types of real-world products and generates a plurality of AR items representing the selected one or more of the different types of real-world products. The generated plurality of AR items are overlaid on different one or more real-world objects depicted in the camera feed of the client device 102 of the user and the client devices 102 of other users who are invited to join the user in the shared shopping experience.

After the users join or launch the shared shopping experience, each user is presented on their own client device 102 an instance of the virtual shared shopping experience of the particular merchant or store. While the shared shopping experience system 224 provides AR displays or the VR store to the users, other users can join and leave the shared shopping experience in real time. The shared shopping experience system 224 presents on displays of the client device 102 of the users virtual AR items that represent products offered for sale by the merchant or store. The virtual shopping experience provides a virtual store that looks like the physical store of the merchant. Namely, the client devices 102 of the users display virtual AR items overlaid on real-world objects depicted in a camera feed of the respective client devices 102. For example, a first client device 102 of a first user can capture an image of a first portion of the real-world environment and display one or more AR items on the first portion of the real-world environment. A second client device 102 of a second user can capture an image of a second portion of the real-world environment and display one or more AR items on the second portion of the real-world environment. The first client device 102 can be physically moved in 3D space and point towards the second portion of the real-world environment such that at least a portion of the image displayed by the first client device 102 includes the same real-world object that is depicted in an image displayed by the second client device 102. In such cases, both the first and second client devices 102 display or overlay the same set of AR items on the same real-world object that is depicted on the images displayed by the respective client devices 102. In this way, the shopping experience is synchronized across a plurality of client devices 102 that are within a threshold proximity of each other. The threshold proximity can be predetermined (e.g., 50 foot proximity threshold) or can be dynamic and dependent on the physical environment that can be captured by the different client devices 102. For example, the client devices 102 can be more than 50 feet away from each other but can both be able to capture an image of the same physical real-world object. In such cases, the AR items are displayed in respectively different scales on the same physical real-world object depicted on the respective client devices 102.

The users can individually and independently navigate and browse the virtual AR items in the virtual AR store. For example, a first user can navigate the virtual store on the client device 102 of the first user by walking around the shared real-world environment (e.g., the shared room in a home, the shared real-world store or outdoor public space). Namely, as the first user walks along a particular path in three dimensions (3D), the shared shopping experience system 224 can determine the trajectory of the user and update the display of the virtual AR store presented to the first user to move the user along the determined trajectory. As the first user turns the client device 102 to the right or in a given direction in 3D, the shared shopping experience system 224 changes the view of the virtual AR store to show the user AR contents of the virtual store that appear on the right or in the given direction in 3D.

A second user can similarly navigate through the virtual store independently of the first user. Namely, the second user can be browsing virtual items that are in a first room of the virtual store and a display of the first room may be provided to the second user on a client device 102 of the second user. While the display of the first room is provided to the client device 102 of the second user, the first user can be browsing AR items in a second room of the virtual AR store and accordingly a display of the second room can be presented to the client device 102 of the first user. The shared shopping experience system 224 maintains virtual 3D positions or coordinates of each user that is currently engaged in the shared shopping experience system 224. Specifically, the shared shopping experience system 224 can assign a first coordinate that represents the current 3D position of the first user in the virtual store (e.g., a first 3D position in the second room) and can assign a second coordinate that represents the current 3D position of the second user in the virtual store (e.g., a 3D second position in the first room).

In some cases, the shared shopping experience system 224 can present indicators on respective displays of the users who are currently engaged in the shared shopping experience that identify which users are engaged in the shared shopping experience and their current 3D positions. The indicators can be conditionally displayed on the basis of whether a client device 102 of a given user points towards a direction in 3D of another user. For example, a client device 102 of a first user can be capturing a video feed that includes images corresponding to a first portion of the shared real-world environment while a second user is physically located in a second portion of the shared real-world environment that is 180 degrees away from the first portion. As a result, the second user is not initially within the field of view corresponding to the first portion (e.g., the second user is not within a camera feed being captured by the client device 102 of the first user). In such cases, the indicator of the second user is presented or overlaid on the camera feed captured and displayed by the client device 102 of the first user to indicate the 3D position of the second user. For example, the indicator can identify the second user (e.g., can be an avatar of the second user) and can be oriented or include an arrow identifying where the second user is physically relative to the first user. As input is received from the client device 102 of the first user indicating that the client device 102 of the first user has been moved (e.g., turned 180 degrees) such that the camera feed now includes a depiction of the second portion of the real-world environment, the field of view of the client device 102 of the first user is updated to depict the second portion. As a result, the client device 102 of the first user is now pointing towards a direction of the physical location of the second user and the second user appears in the video feed captured by the client device 102 of the first user. In response, the shared shopping experience system 224 removes display of the indicator that uniquely identifies the second user within a display of the virtual store on the client device 102 of the first user. In some cases, the indicator can only be displayed when the second user is depicted within a camera feed of the client device 102 of the first user. In these circumstances, the indicators can represent the current activity being performed by the second user associated with the indicator.

In some cases, the indicators of the physical locations of the other users within the virtual store include pins. In some cases, the indicators of the physical locations of the other users include avatars of the other users. The pins or avatars can include a name of the respective user represented by the indicator. The pins or avatars can also include information about the current activity being performed by the other users, such as whether the other user associated with the indicator is accessing detailed information on a given product, is virtually trying on a product, is checking out and purchasing a product, has picked up a product or is performing some other action.

In some embodiments, the shared shopping experience system 224 presents a list of AR items corresponding to real-world products in a field of view of a client device 102 of a first user, such as on one or more real-world objects depicted within a camera feed of the client device 102 of the first user. The list of AR items can represent different types of real-world products, such as shirts, shoes and pants. The shared shopping experience system 224 can update the display attributes of the list of virtual reality items that is presented on the client device 102 of the first user based on action types performed by a second user operating another client device 102. For example, the shared shopping experience system 224 can detect that the second user has selected a given AR item to try on or to view more details. In response, the shared shopping experience system 224 can modify the display attribute in a first manner to present a visual indicator (e.g., highlight region) on one of the AR items in the list of AR items to indicate that the given AR item is being acted upon or interacted by another user. For example, if the shared shopping experience system 224 detects that the second user has selected to try on virtual reality pants, the shared shopping experience system 224 can modify the display attribute in a first manner, such as by displaying a blue border around a first of the AR items corresponding to the pants physical product.

As an example, the shared shopping experience system 224 can present a first stack of AR items corresponding to pants and a second stack of AR items corresponding to shirts. If the second user selects to try on the pants, the shared shopping experience system 224 can modify the display attribute in a first manner to display a blue border around the first stack of AR items presented on the client device 102 of the first user to indicate that the second user has performed an action type to try on the pants. If the second user selects to purchase the pants, the shared shopping experience system 224 can modify the display attribute in a second manner to display a red border around the first stack of AR items presented on the client device 102 of the first user to indicate that the second user has performed an action type to purchase the pants. If the second user selects to try on the shirts, the shared shopping experience system 224 can modify the display attribute in a third manner to display a blue border around the second stack of AR items presented on the client device 102 of the first user to indicate that the second user has performed an action type to try on the shirts. If the second user selects to purchase the shirts, the shared shopping experience system 224 can modify the display attribute in a fourth manner to display a red border around the first stack of AR items presented on the client device 102 of the first user to indicate that the second user has performed an action type to purchase the shirts.

In some cases, the shared shopping experience system 224 can reduce a quantity of AR items that are in the list presented on the client device 102 of the first user in response to detecting that the second user has selected to try on or view more details about the AR item. For example, the shared shopping experience system 224 can present a first stack of AR items corresponding to pants that appears to include 5 pants and a second stack of AR items corresponding to shirts that appears to include 7 shirts. If the second user selects to try on the pants, the shared shopping experience system 224 can reduce the quantity of pants included in the first stack of AR items presented on the client device 102 from 5 to 4. If the second user selects to try on the shirts, the shared shopping experience system 224 can reduce the quantity of shirts included in the second stack of AR items presented on the client device 102 of the first user from 7 to 6. The shared shopping experience system 224 can detect that the second user elected to not purchase the shirts that has been tried on. In response, the shared shopping experience system 224 can increase the quantity of shirts included in the second stack of AR items presented on the client device 102 of the first user from 6 to 7.

In some embodiments, the shared shopping experience system 224 can access an inventory of the store associated with the virtual store. The shared shopping experience system 224 can select how many AR items to present based on the inventory of the store. For example, the shared shopping experience system 224 can determine that there are 30 pants available in the store inventory. In response, the shared shopping experience system 224 can display up to a maximum of 7 AR items corresponding to pants in a first stack of AR items. As another example, the shared shopping experience system 224 can determine that there are 6 shirts available in the store inventory. In response, the shared shopping experience system 224 can display 6 or some other quantity less than the total available shirts as in a second stack of AR items corresponding to the shirts. As another example, the shared shopping experience system 224 can determine that there is one dress available in the store inventory. In response, the shared shopping experience system 224 can display one AR item corresponding to the dress. The shared shopping experience system 224 can detect input from a client device 102 indicating selection of the AR item corresponding to the dress. The shared shopping experience system 224 can determine that the selected AR item corresponds to a last dress that is available. In response, the shared shopping experience system 224 removes the AR item from being presented to any other user who is engaged in the virtual store. Namely, the shared shopping experience system 224 can associate a non-fungible token (NFT) with each real-world physical item available in the inventory of the store. The shared shopping experience system 224 can generate a unique AR item corresponding to each of the real-world physical items using the NFT associated with each of the real-world physical items. In this way, each AR item that is presented in the virtual storefront to the users of the shared shopping experience is uniquely representative of the real-world product available in the store inventory.

In some embodiments, the shared shopping experience system 224 presents a virtual or real-world mannequin in the virtual store. Two or more users that are engaged in the shared shopping experience system 224 can access a field of view that includes the virtual or real-world mannequin. For example, the two or more users can each be capturing images on respective client devices 102 that depict the real-world mannequin. As another example, the two or more users can each be capturing images on respective client devices 102 that depict a real-world object over which a virtual AR mannequin is displayed. The shared shopping experience system 224 can receive input from a client device 102 of a first user to add an article of clothing to the virtual or real-world mannequin, such as an AR hat. In response, the shared shopping experience system 224 modifies the virtual or real-world mannequin depicted in the images displayed on the respective client devices 102 of the two or more users to include the AR hat selected by the first user. The shared shopping experience system 224 can receive input from a client device 102 of a second user to add another article of clothing to the virtual or real-world mannequin, such as an AR shirt. In response, the shared shopping experience system 224 modifies the virtual or real-world mannequin depicted in the images displayed on the respective client devices 102 to include the AR hat selected by the first user and the AR shirt selected by the second user. In this way, each user can uniquely modify components of the virtual store in a way that is represented to other users that are engaged in the virtual store.

The shared shopping experience system 224 can also allow the users engaged in the virtual shared shopping experience to exchange messages. For example, the shared shopping experience system 224 can allow a first user to type a message. The shared shopping experience system 224 can then present that message as an overlay of the virtual store presented to each of the users who are engaged in the shared shopping experience. Namely, the contents of the messages can be overlaid on AR items of the virtual store presented to each of the users who are browsing the virtual store. As another example, the contents of the messages can be overlaid on a real-world environment depicted in images captured and displayed on respective client devices 102 of the users who are browsing the virtual store. The shared shopping experience system 224 can receive responses from the users via their respective client devices 102 and can update the list of messages to include the responses.

In some examples, the shared shopping experience system 224 can receive input from a client device 102 of the second user who is engaged in the shared shopping experience requesting to virtually try on a given AR item. For example, the client device 102 of the second user can receive a tap on a screen of the client device at a position in which the given AR item is overlaid on the camera feed. In response, a set of options including an option to virtually try on the given AR item are displayed. In response to receiving a selection of the option to virtually try on the given AR item, the shared shopping experience system 224 activates a front-facing camera of the client device 102 and captures one or more images of the second user. The shared shopping experience system 224 overlays the given AR item on the second user depicted in the one or more images. The shared shopping experience system 224 can detect that a client device 102 of a first user is pointing towards the second user. For example, the shared shopping experience system 224 can determine that the client device 102 of the first user is capturing a video feed that depicts the second user. In response, the shared shopping experience system 224 also displays the given AR item overlaid on the second user in the camera feed displayed by the client device 102 of the first user.

The shared shopping experience system 224 can receive input from the first user to add another AR item to the second user or to replace the given AR item with a different AR item. In response, the shared shopping experience system 224 adds the other AR item to the depiction of the second user in the camera feeds of the client devices of the first and second users. In this way, the second user appears to be wearing the given AR item selected by the second user together with the other AR item selected by the first user. If the input from the first user selects to replace the given AR item, the shared shopping experience system 224 replaces the display of the given AR item on the second user with the other AR item in the depiction of the second user in the camera feeds of the client devices of the first and second users. This allows the two users to interact in AR to virtually try on different AR items and provide feedback to each other by exchanging one or more messages.

In some examples, the shared shopping experience system 224 can detect an outside person within a camera feed of one or more of the client devices 102 of the users who are engaged in the shared shopping experience. The outside person may be a person or object who has not been invited to join the shared shopping experience of the users. For example, the shared shopping experience system 224 can process images received from a given client device 102 of the users who are engaged in the shared shopping experience. The shared shopping experience system 224 can perform object recognition and face detection on the image to extract features (e.g., an identity) of the face of the person depicted in the images. The shared shopping experience system 224 can also include a set of facial features or other identifying attributes (or identities) of each user who is engaged in the shared shopping experience. The shared shopping experience system 224 can determine that the facial features (identity) of the person who is depicted in the images fail to match the facial features or identifying attributes (identities) of the users who are engaged in the shared shopping experience and may determine that such a person is an outside person. In response, the shared shopping experience system 224 can perform an occlusion process to remove or occlude the outside person from the camera feed of the client device 102 in which the person is depicted. As an example, the shared shopping experience system 224 can perform body tracking using one or more machine learning techniques (e.g., one or more trained neural networks) to segment the entire body of the outside person in the images. The shared shopping experience system 224 can then blend each pixel that is within the segmented entire body of the outside person with a background of the shared shopping experience. In another example, the shared shopping experience system 224 can replace the portion of the image that includes the segmented entire body of the outside person with another virtual object (e.g., a cartoon or other AR item available for purchase or mannequin).

The shared shopping experience system 224 is a component that can be accessed by an AR/VR application implemented on the client device 102. The AR/VR application uses an RGB camera to capture an image of a room in a home. The AR/VR application applies various trained machine learning techniques on the captured image of the room to generate a virtual or augmented reality storefront that includes various virtual items representing products associated with the store.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time. The profile data 316 can include facial features or other identifying attributes of users who are engaged in a shared shopping experience.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
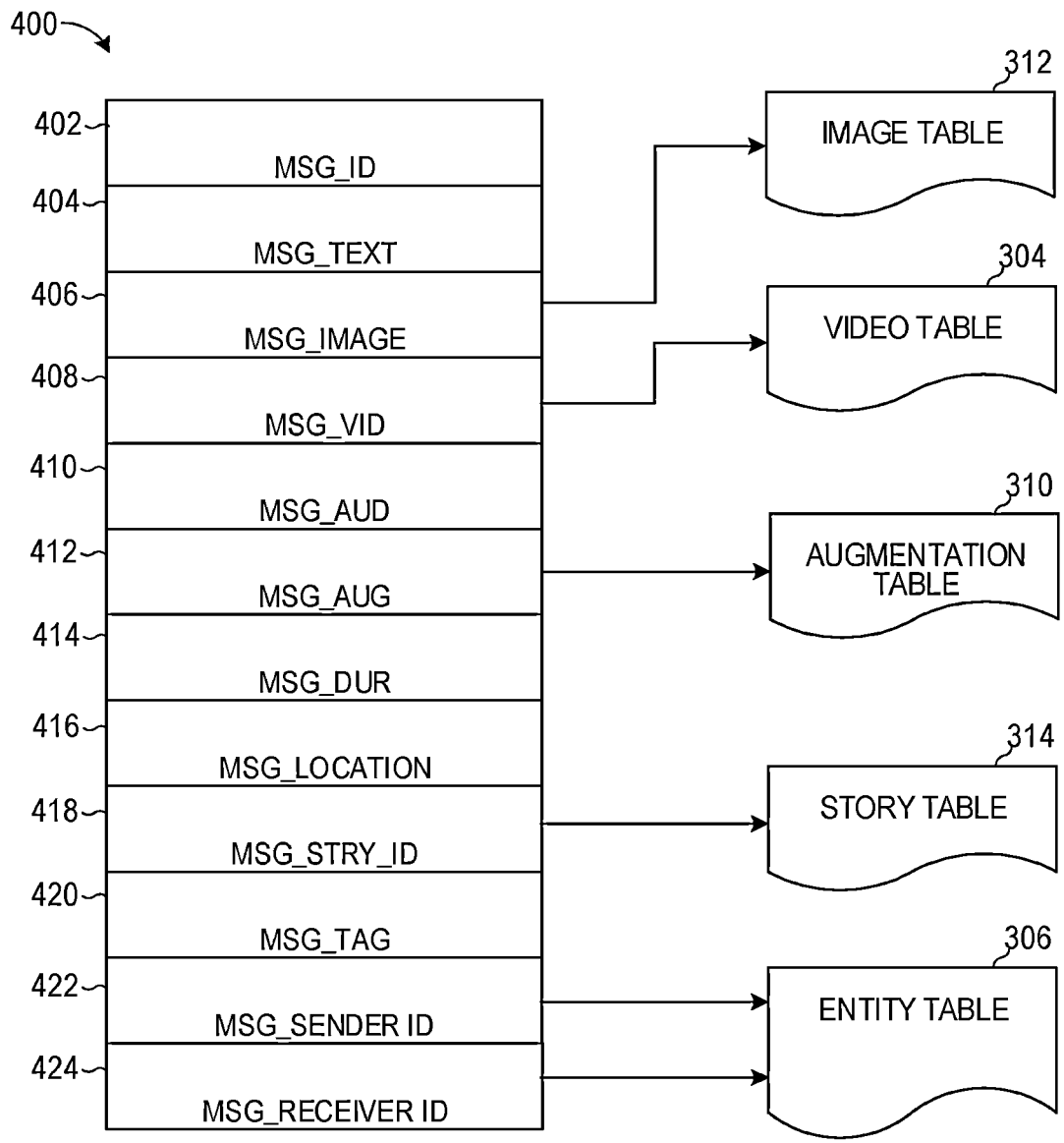
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifies values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
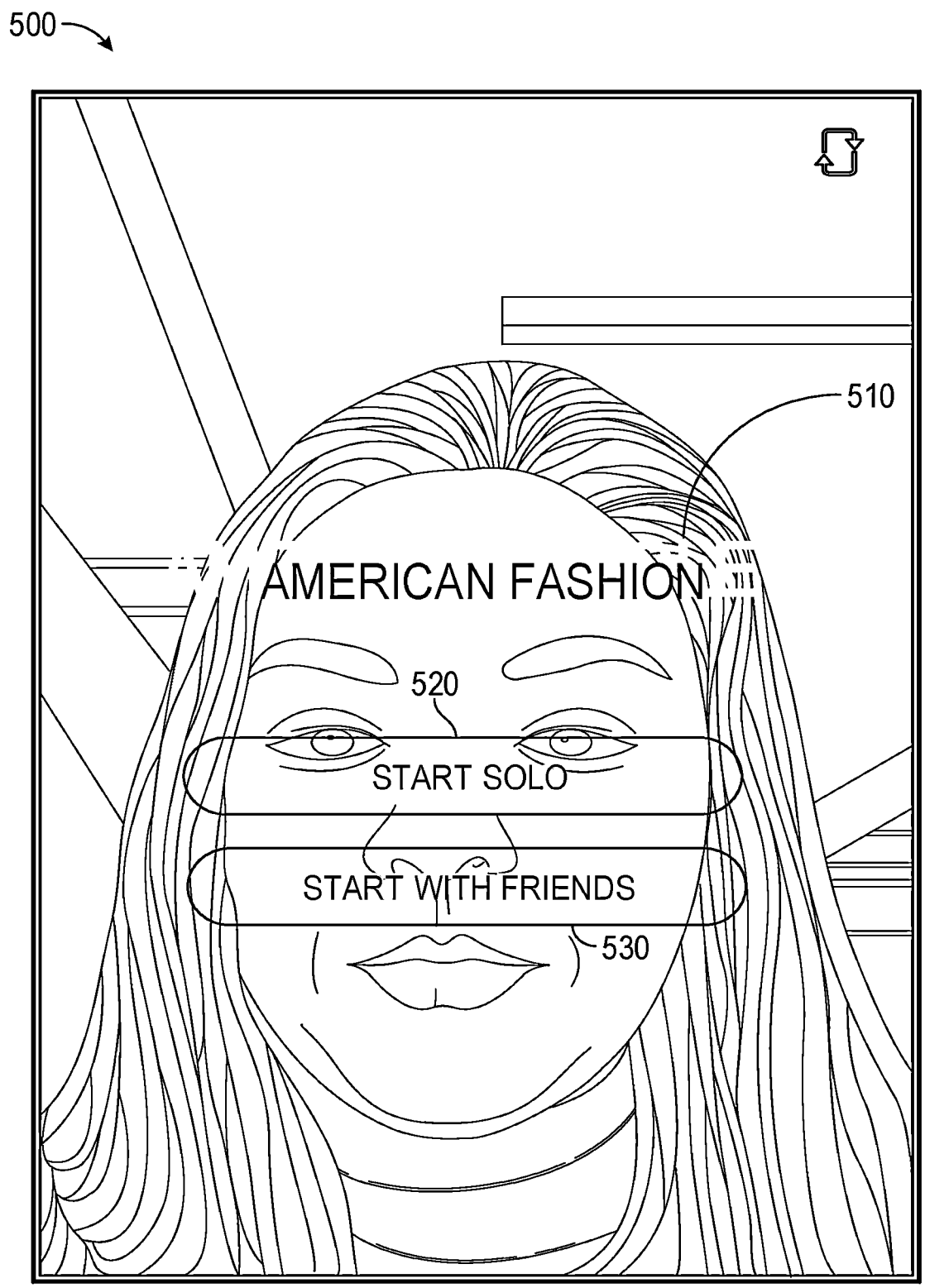
FIGS. 5, 6, 7A, 7B, 8 and 9 are diagrammatic representations of outputs of the shared shopping experience system, in accordance with some examples.

FIGS. 5, 6, 7A, 7B, 8 and 9 are diagrammatic representations of outputs of the shared shopping experience system 224, in accordance with some examples. For example, as shown in FIG. 5, a user interface 500 is provided on client device 102 of a first user. The user interface 500 includes a portal page that identifies a merchant or store by name 510. The user interface 500 includes a first option 520 to browse in AR the virtual store of the identified merchant or store alone. The user interface 500 includes a second option 530 to browse in AR the virtual store of the identified merchant or store with one or more other users.

In response to receiving input from the client device 102 indicating selection of the first option 520, the shared shopping experience system 224 launches an AR version of the store. The AR version of the store includes a plurality of virtual items corresponding to real-world items (e.g., physical items) sold by the merchant or store. The shared shopping experience system 224 allows the user to individually browse contents of the store, try on AR items, access additional information for the AR items, and purchase the real-world products corresponding to the AR items being browsed. As discussed above, in response to receiving input indicating selection of the first option 520, the shared shopping experience system 224 presents a screen that allows a user to select the types of real-world products the user is interested in browsing. The types of real-world products included in the screen can be determined based on one or more attributes of a real-world object depicted in a camera feed of the client device 102 of the user. After the user selects one or more types of the real-world products, the shared shopping experience system 224 generates AR items corresponding to the selected one or more types of the real-world products and overlays the AR items on the real-world objects depicted in the camera feed.

In response to receiving input from the client device 102 indicating selection of the second option 530, the shared shopping experience system 224 presents a user interface to the client device 102 of the first user for inviting one or more friends to the virtual store. The shared shopping experience system 224 can search for friends of the user on the messaging client 104 who are determined to be within a threshold proximity to the user. For example, the shared shopping experience system 224 can access location information (if shared) by the client devices 102 of the friends of the user. The shared shopping experience system 224 can compare the accessed location information to the location of the client device 102 of the user to compute a distance between the locations of the client devices 102 of the friends to the client device 102 of the user. If the distance between a given client device 102 of the friend and the client device 102 of the user is determined to be less than the threshold proximity (e.g., less than 50 feet), the shared shopping experience system 224 includes an identifier of the corresponding friend in the screen allowing the user to invite the friend to join the user in the shared shopping experience. If the distance between a given client device 102 of the friend and the client device 102 of the user is determined to be greater than or equal to the threshold proximity (e.g., more than or equal to 50 feet), the shared shopping experience system 224 excludes an identifier of the corresponding friend in the screen preventing the user from inviting the friend to join the user in the shared shopping experience.

The shared shopping experience system 224 can receive input from the user that selects one or more friends from the user interface. As discussed above, the user interface presented in response to receiving input indicating selection of the second option 530 can also include options that allow the user to select the types of real-world products the user is interested in browsing. The types of real-world products included in the screen can be determined based on one or more attributes of a real-world object depicted in a camera feed of the client device 102 of the user. After the user selects one or more types of the real-world products, the shared shopping experience system 224 generates AR items corresponding to the selected one or more types of the real-world products and overlays the AR items on the real-world objects depicted in the camera feed.

The shared shopping experience system 224 can send messages to the selected one or more friends on their respective client device 102. The messages can identify the types of real-world products selected by the user that are represented in the shared shopping experience. The messages may inform the one or more friends that the first user would like to engage in a shared shopping experience with the one or more friends and include an option to join the shared shopping experience. In some cases, the second option 530 can be provided within a communication session engaged in a group chat interface. In response to receiving a user selection of the second option 530 within the group chat interface, the shared shopping experience system 224 invites all of the members in the group chat who are within a threshold proximity of each other to join the shared shopping experience together.

Figure 6:

After the users and friends select to join the shared shopping experience, an AR storefront is presented to the users on their respective client devices 102. The AR storefront includes one or more AR items that are overlaid on real-world objects depicted in the camera feed of the client device 102 of the first user. For example, as shown in FIG. 6, the user interface 600 is presented on the client device 102 of a first user in which one or more AR items that are overlaid on real-world objects depicted in the camera feed of the client device 102 of the first user. A second user may interface with a client device 102 of the second user and request to join the first user in the shared shopping experience. In response, the shared shopping experience system 224 displays one or more AR items of the same AR storefront on the real-world objects depicted in the camera feed of the client device 102 of the second user.

The shared shopping experience system 224 can present a message or prompt 610 on the display of the client device 102 of the first user indicating that the second user has joined and/or identifying all the users who are currently engaged in the shared shopping experience. The message or prompt 610 may include avatars or identifiers 614 of all the users who are currently in the AR store and engaged in the virtual shopping experience. The message or prompt 610 may also include a unique identifier 612 of the merchant or store associated with the virtual shopping experience, such as the source of the real-world items being represented by the AR items in the virtual store shown to the users engaged in the shared shopping experience. The message or prompt 610 may continuously or periodically provide status updates of actions being performed by each of the users in the virtual shopping experience. For example, if a second user is detected to be trying on virtually an AR item, the message or prompt 610 may be provided to all other users who are engaged in the shared shopping experience identifying the second user and the action being performed (e.g., virtually trying on an item). The shared shopping experience system 224 can receive input from a given user that selects the message or prompt 610 and in response, the shared shopping experience system 224 can inform the user about how to navigate in the real-world environment to reach the real-world location of the second user in order to begin capturing a camera feed that depicts the second user performing the action (e.g., trying on virtually an AR item).

The shared shopping experience system 224 can present presence indicators 620. The presence indicators 620 identify all the users who are currently engaged in the shared shopping experience, such as using avatars. A given presence indicator 620 can be selected to send a message to or otherwise communicate with a user associated with the given presence indicator 620.

A virtual or AR mannequin 630 may be presented to two or more users who are capturing a camera feed of a real-world portion associated with display of the virtual or AR mannequin 630. The shared shopping experience system 224 can receive input from a client device 102 of a first user to add an article of clothing to the virtual or AR mannequin 630, such as an AR hat. In response, the shared shopping experience system 224 modifies the virtual or AR mannequin 630 to include the AR hat selected by the first user. The shared shopping experience system 224 can receive input from a client device 102 of a second user to add another article of clothing to the virtual or AR mannequin 630, such as an AR shirt. In response, the shared shopping experience system 224 modifies the virtual or AR mannequin 630 to include the AR hat selected by the first user and the AR shirt selected by the second user. In this way, each user can uniquely modify components of the AR (virtual) store in a way that is represented to other users that are engaged in the virtual store.

Figure 7A:
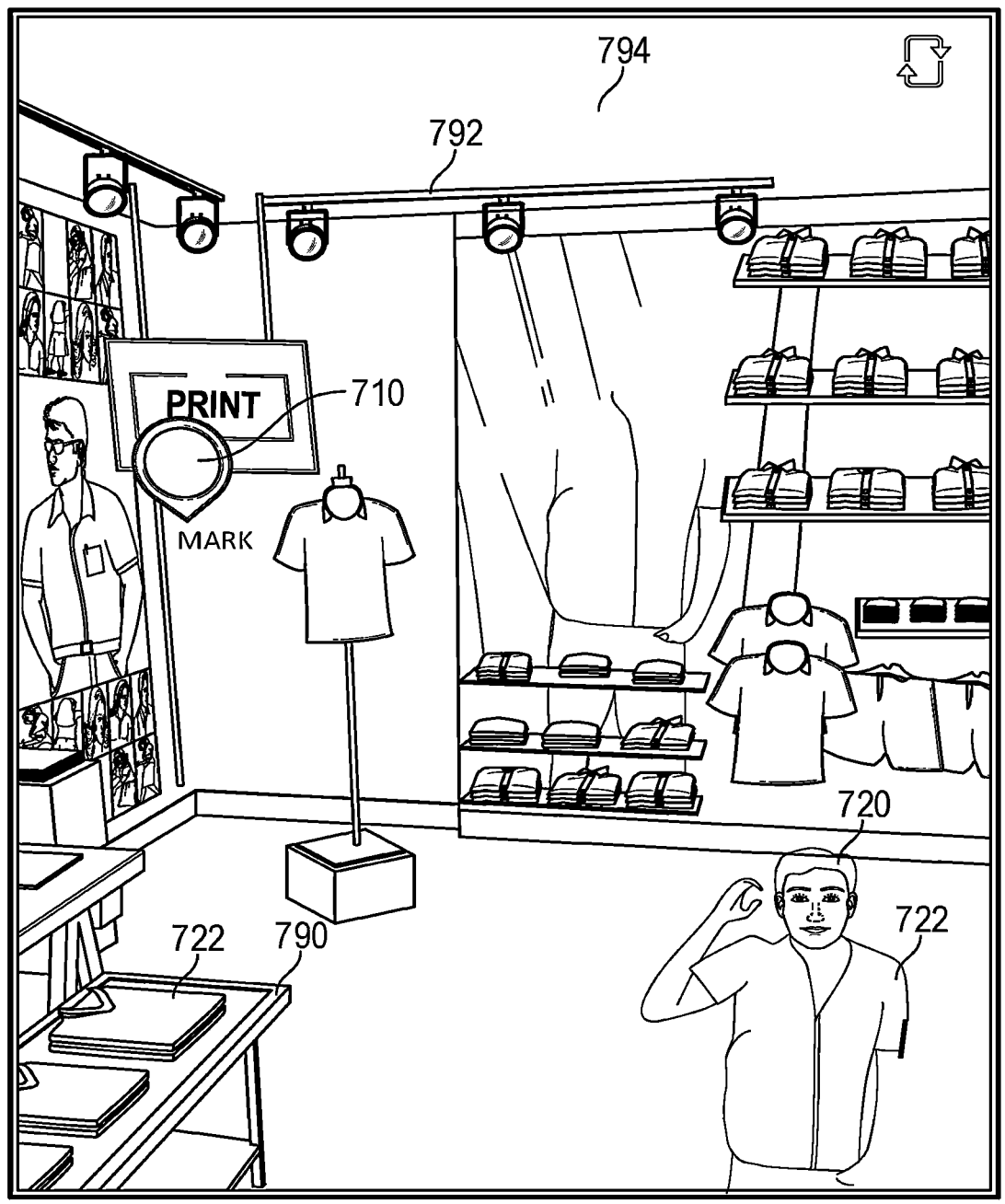
Figure 7B:
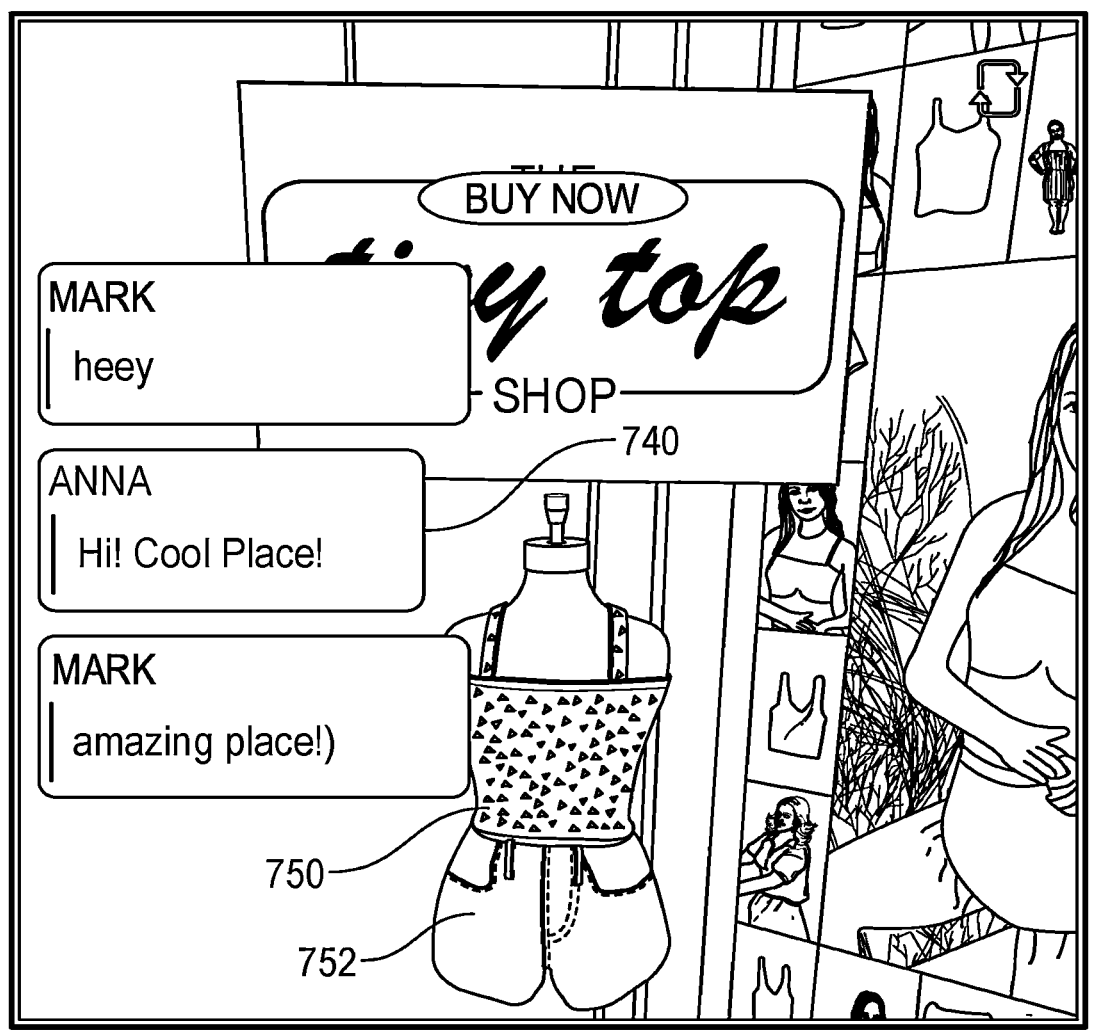

In some embodiments, the shared shopping experience system 224 can present indicators on respective displays of the users who are currently engaged in the shared shopping experience that identify which users are engaged in the shared shopping experience and their current real-world 3D positions or coordinates. The indicators can be conditionally displayed on the basis of whether a client device 102 of a given user points towards a direction in 3D of another user. For example, as shown in FIG. 6, a client device 102 of a first user can be pointed to capture a camera feed corresponding to a first portion of the virtual store in which a first collection of virtual items is displayed while a second user is physically located in a second portion of the virtual store in which a second collection of virtual items is displayed that is 180 degrees away from the first portion. The physical location of the second user is not initially within the camera feed corresponding to the first portion. As input is received from the client device 102 of the first user that the client device 102 of the first user has been moved (e.g., turned 180 degrees), the camera feed of the client device 102 of the first user is updated to depict the second portion, as shown in FIG. 7A. As a result, user interface 700 (FIG. 7A) is presented on the client device 102 of the first user who is now capturing a camera feed that depicts the second user 720 and excludes an indicator from being displayed.

The user interface 700 presented on the client device 102 of the first user includes a first real-world object 790. The first real-world object 790 may include real-world shelves. The shared shopping experience system 224 selects one or more AR items 722 that match the real-world shelves and displays the one or more AR items 722 on the depiction of the first real-world object 790 included in the camera feed captured by the client device 102 of the first user. The user interface 700 presented on the client device 102 of the first user includes a second real-world object 794. The second real-world object 794 may include a real-world ceiling. The shared shopping experience system 224 selects one or more AR items 792 that match the real-world ceiling and displays the one or more AR items 792 on the depiction of the second real-world object 794 included in the camera feed captured by the client device 102 of the first user. The one or more AR items 792 may correspond to decorative aspects of the virtual store that do not relate to real-world products sold by the store. For example, the one or more AR items 792 can include one or more AR spotlights. The one or more AR items 792 can generate virtual light that is projected on one or more other real-world objects depicted in the camera feed and/or one or more other AR items overlaid on the real-world objects depicted in the camera feed.

The shared shopping experience system 224 can determine that the second user is currently trying on an AR item 722 on the client device 102 of the second user. In response, the shared shopping experience system 224 presents the AR item 722 on the depiction of the second user 720 presented on the client device 102 of the first user. The shared shopping experience system 224 can receive input from the client device 102 of the first user that adds more AR items to the depiction of the second user 720 and/or replaces the AR item 722 with a different AR item. Any modifications performed by the first user are reflected and presented to the second user on the client device 102 of the second user. Namely, the client device 102 of the second user can update the AR item being overlaid on the camera feed depicting the second user with the new AR items selected by the first user.

The user interface 700 includes an indicator 710 that uniquely identifies a third user within a display of the virtual store on the client device 102 of the first user. Namely, the shared shopping experience system 224 can determine that the third user is not within a camera feed being captured by the client device 102 of the first user and may in response display the indicator 710 of the third user. The indicator 710 may identify the real-world location or coordinates of the third user. The indicator 710 can be used to provide instructions to the first user on how to navigate the real-world environment to reach the third user and to begin capturing a camera feed that depicts the third user.

In some embodiments, the shared shopping experience system 224 presents a user interface 701 (FIG. 7B) that allows the user to exchange one or more messages 740 with one another. The messages 740 may identify the user who sent the message by the name of the user. The messages 740 may be overlaid or displayed on top of the respective user interfaces of the shared shopping experience (virtual stores) on their respective client devices 102. As discussed above, a virtual mannequin may be presented to two or more users on their respective client devices 102 in response to the client devices 102 capturing a camera feed of real-world objects over which the virtual or AR mannequin is displayed. The shared shopping experience system 224 can receive input from a client device 102 of a first user to add an article of clothing to the virtual or AR mannequin, such as an AR shirt 750. In response, the shared shopping experience system 224 modifies the virtual or AR mannequin to include the AR shirt 750 selected by the first user. The shared shopping experience system 224 can receive input from a client device 102 of a second user to add another article of clothing to the virtual or AR mannequin, such as AR shorts 752. In response, the shared shopping experience system 224 modifies the virtual or AR mannequin to include the AR shirt 750 selected by the first user and the AR shorts 752 selected by the second user. In this way, each user can uniquely modify components of the virtual store in AR in a way that is represented to other users that are engaged in the virtual store.

Figure 8:
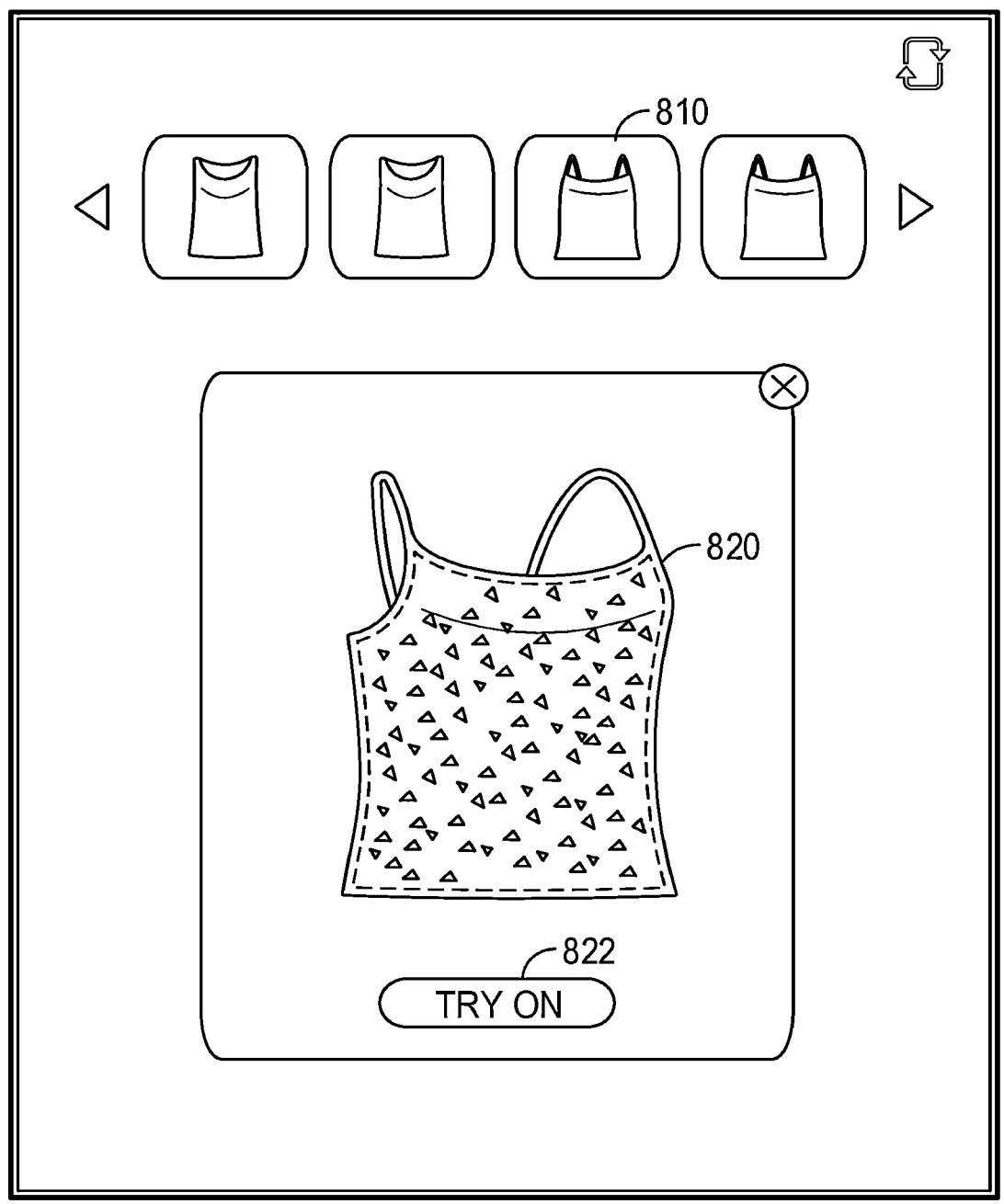

In some embodiments, the shared shopping experience system 224 can receive input from the client device 102 of the second user indicating selection of a given AR item 722, such as one that corresponds to real-world shirts. The selection may correspond to an action to view additional information about the AR item 722. In response, the shared shopping experience system 224 presents a full screen view of the selected AR item 722 on the client device 102 of the second user. For example, as shown in FIG. 8, the shared shopping experience system 224 displays a full screen user interface 800 that depicts the selected AR item 722. The full screen user interface 800 displays the selected AR item 722 as a 3D image of the first real-world product corresponding to the AR item 722 in a second size larger than a first size in which the selected AR item 722 is displayed to the other users. For example, an AR shirt corresponding to the virtual reality item 722 is displayed in a first size in a stack of AR items, as shown in FIG. 7A. After receiving input that requests additional information for the AR item 722, the shared shopping experience system 224 displays a full screen view of the AR item 820 (e.g., the AR shirt) in a second size that is larger than the first size.

The full screen user interface 800 is presented to the second user while other users, such as the first user, continue to be presented on their respective client device 102 a view of the AR store, such as AR items. The full screen user interface 800 includes a navigation region 810. The shared shopping experience system 224 can receive input from the second user that navigates the navigation region 810. The navigation region 810 can include options to modify aspects or visual attributes of the selected AR item 722. For example, the navigation region 810 allows the user to select alternate sizes, colors or styles for the selected AR item 722. In response, the shared shopping experience system 224 updates the view of the AR item 820 in accordance with the selection from the navigation region 810. The modifications to the selected AR item 722 are presented to any client device 102 that is capturing a camera feed that depicts the second user. The shared shopping experience system 224 can display a try on option 822.

In response to receiving a selection of the try on option 822, the shared shopping experience system 224 can allow the second user to virtually try on the AR item 820. Namely, the shared shopping experience system 224 can activate a front-facing camera of the client device 102 of the second user. The shared shopping experience system 224 can capture a video of the full body of the second user and present the video of the full body on the display of the client device 102 of the second user. The shared shopping experience system 224 can overlay or augment the full body in the video with the selected AR item 820 to allow the user to see how the AR item looks on the user. In some cases, the AR item 820 corresponds to a piece of furniture. In such cases, the shared shopping experience system 224 can activate a rear-facing camera of the client device 102 of the second user. The shared shopping experience system 224 can capture a video of the real-world environment of the second user and present the video of the real-world environment on the display of the client device 102 of the second user. The shared shopping experience system 224 can overlay or augment the real-world environment in the video with the selected AR item 820 to allow the user to see how the AR item looks in the real-world environment. Any modifications to the selected AR item 722 performed by the second user are presented to any client device 102 that is capturing a camera feed that depicts the second user or a portion of the real-world environment over which the second user has requested to display the AR item (e.g., an AR furniture item).

Figure 9:
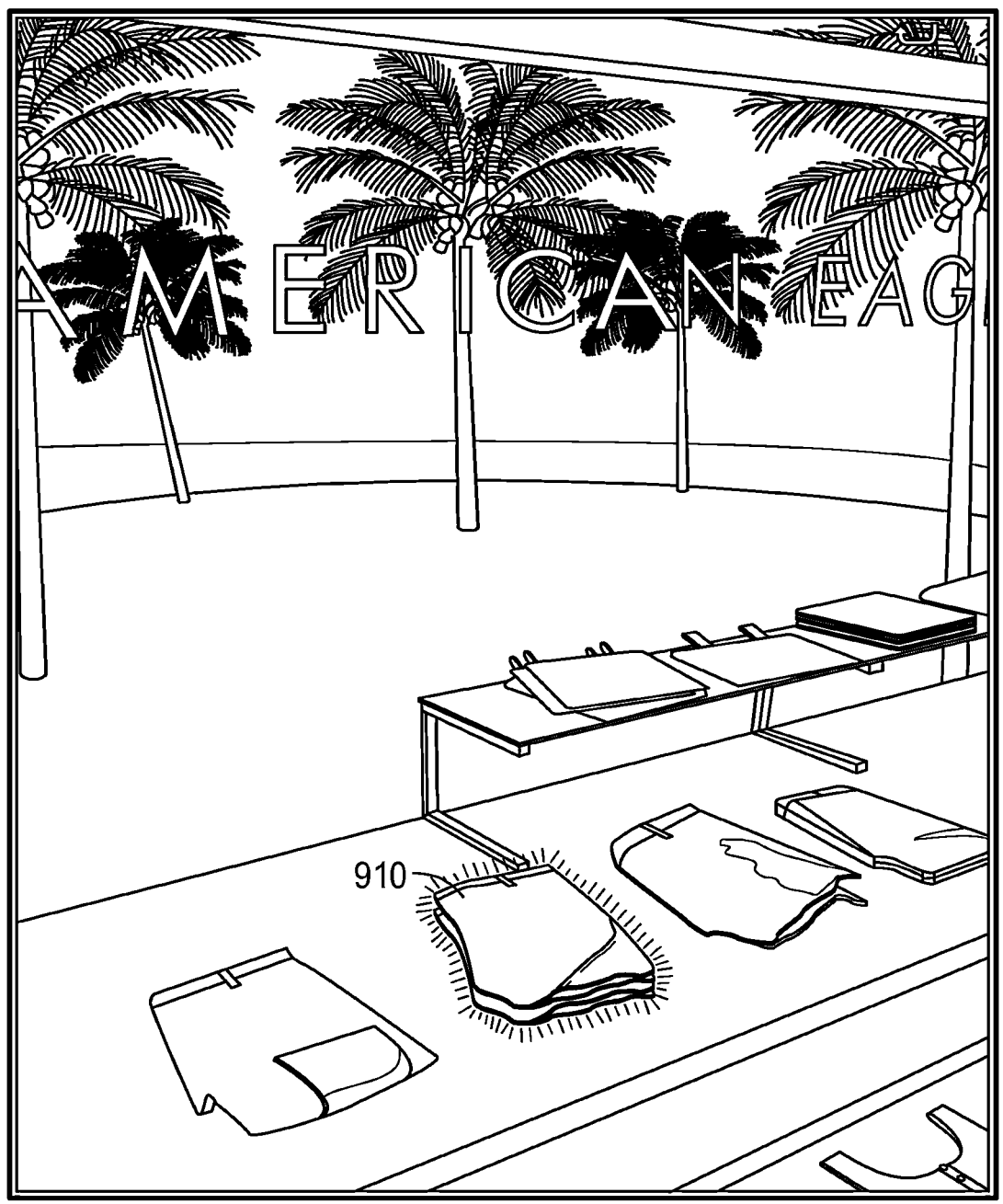

In response to receiving a selection of the try on option 822, the shopping experience system 224 can update the prompt 610 presented on other client devices 102 to indicate that the second user is trying on an AR item. The shopping experience system 224 can also update a display attribute of the AR item 722 in the display of the AR item 722 provided on the client device 102 of the first user and other users to indicate the action type being performed by the second user in association with the AR item 722. For example, as shown in FIG. 9, the user interface 900 includes a depiction of the AR item 722 with a blue border 910 to indicate that another user, such as the second user, is trying on the AR item 722. Namely, the shared shopping experience system 224 modifies a display attribute of the AR item 722 presented to a first user in a first manner to indicate that the second user is performing a first action type, such as trying on the AR item 722. The shared shopping experience system 224 can also update the quantity of AR items included in the stack of AR items shown to the users in response to detecting that a given user has selected the AR item and/or based on an inventory of the store. For example, referring back to FIG. 7A, multiple stacks of AR items are depicted. Each stack can include a different quantity of items. The quantities of items presented to the users in the virtual store are increased or decreased based on actions of other users, such as whether the other users have selected the items, are browsing the items, are purchasing the items, have added the items to their shopping carts, or are virtually trying on the items.

Figure 10:
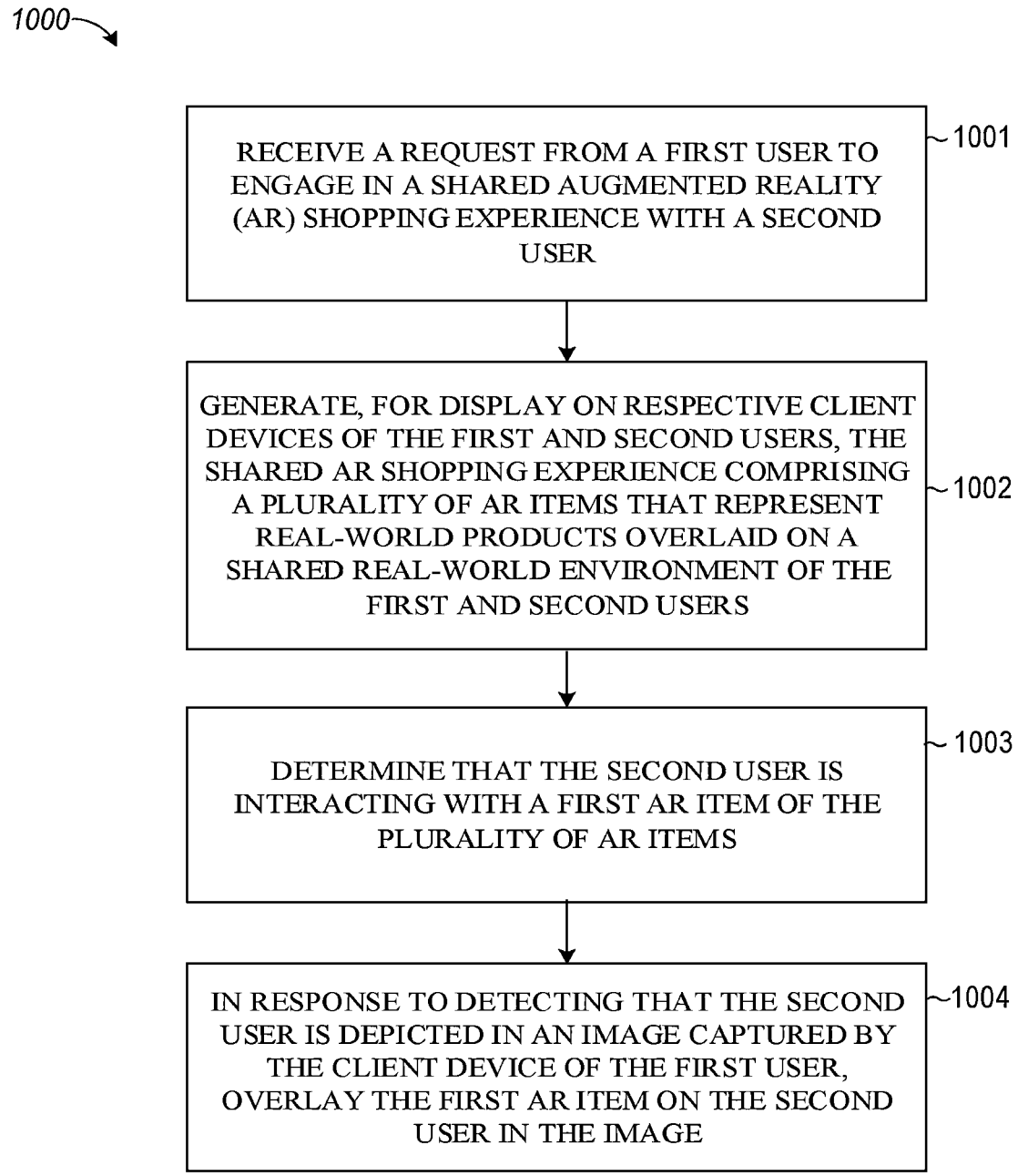
FIG. 10 is a flowchart illustrating example operations of the messaging application server, according to examples.

FIG. 10 is a flowchart of a process 1000, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, the shared shopping experience system 224 receives a request from a first user to engage in a shared AR shopping experience with a second user, as discussed above.

At operation 1002, the shared shopping experience system 224 generates, for display on respective client devices of the first and second users, the shared AR shopping experience comprising a plurality of AR items that represent real-world products overlaid on a shared real-world environment of the first and second users, as discussed above.

At operation 1003, the shared shopping experience system 224 determines that the second user is interacting with a first AR item of the plurality of AR items, as discussed above. For example, the shared shopping experience system 224 determines that the second user is trying on virtually the first AR item (e.g., virtually trying on a hat, shirt, pants, or makeup).

At operation 1004, the shared shopping experience system 224, in response to detecting that the second user is depicted in an image captured by the client device of the first user, overlays the first AR item on the second user in the image, as discussed above.

Machine Architecture

Figure 11:
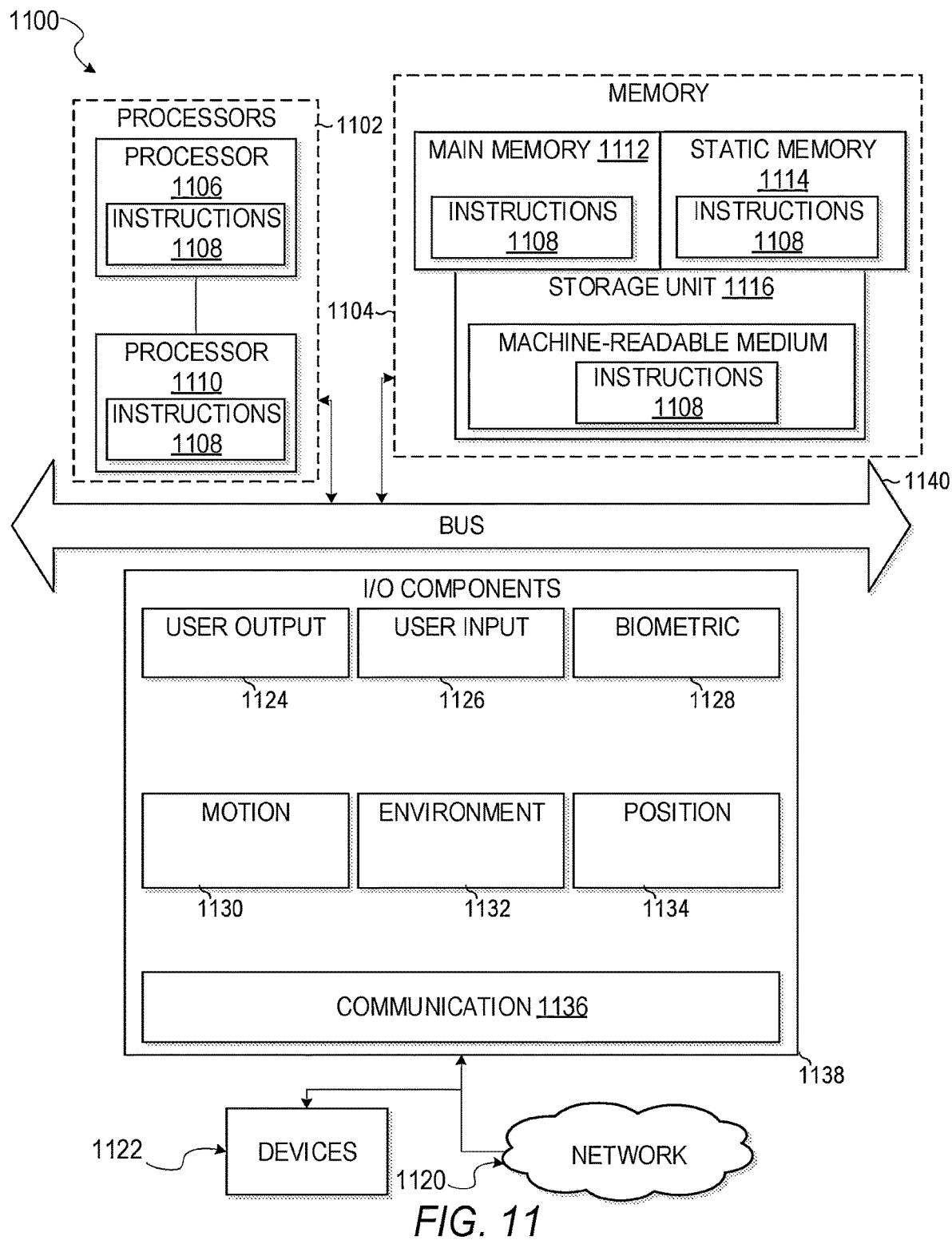
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of a machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1112, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
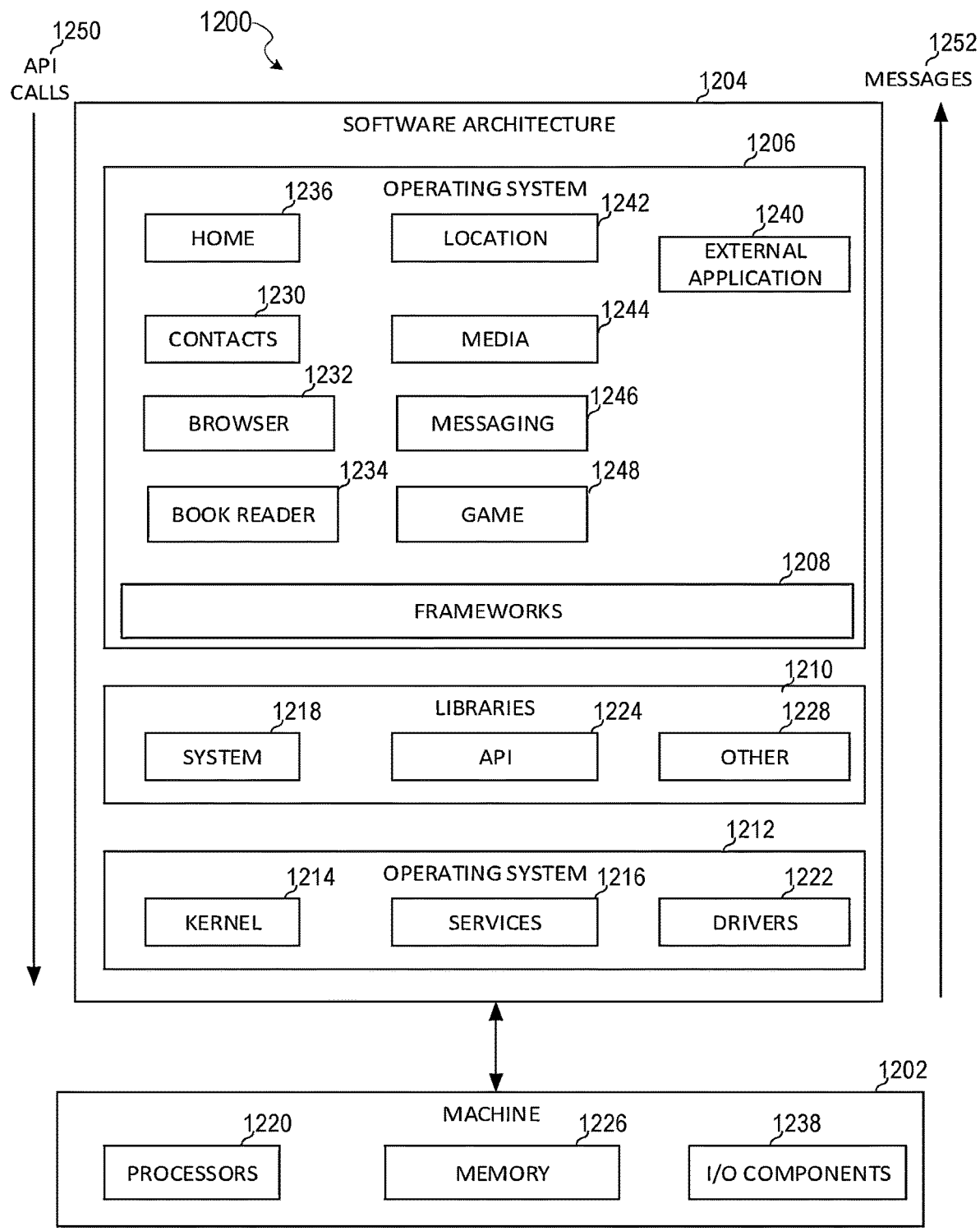
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   determining that one or more images captured by a client device of a second user includes a depiction of a person, the client device being engaged in a shared augmented reality (AR) shopping experience with a client device of a first user;
   determining that an identity of the person fails to match any of a plurality of identities of users engaged in the shared AR shopping experience; and
   in response to determining that the identity of the person fails to match any of the plurality of identities of the users engaged in the shared AR shopping experience, occluding the depiction of the person in the one or more images displayed on the client device of the second user.

2. The method of claim 1, further comprising:
   generating a portal page that represents a store, the portal page comprising a first option to access the shared AR shopping experience alone and a second option to access the shared AR shopping experience with a plurality of users.

3. The method of claim 2, further comprising:
   in response to a selection of the second option, generating, for display on respective client devices of the first and second users, the shared AR shopping experience comprising a plurality of AR items that represent real-world products overlaid on a shared real-world environment of the first and second users;
   determining that the first user is interacting with a first AR item of the plurality of AR items; and
   in response to detecting that the first user is depicted in an image captured by the client device of the second user, overlaying the first AR item on the first user in the image.

4. The method of claim 1, further comprising:
   generating for display, within the shared AR shopping experience on the client devices of the first and second users, a list of messages exchanged between the first and second users.

5. The method of claim 1, further comprising:
   generating for display within the display of the shared AR shopping experience on the client device of the first user an indicator of a location of the second user.

6. The method of claim 1, further comprising:
   receiving input from the client device of the second user requesting to virtually try on a first AR item;
   activating a camera of the client device of the second user; and
   overlaying the first AR item on an image of the second user captured by the camera of the client device of the second user.

7. The method of claim 5, further comprising:
   receiving input from the client device of the first user that selects a second AR item; and
   in response to receiving input from the client device of the first user that selects the second AR item:
   causing the second AR item to be overlaid together with the first AR item on the image of the second user captured by a camera of the client device of the second user; and
   overlaying the first and second AR items on the image of the second user captured by the camera of the client device of the first user.

8. The method of claim 1, further comprising:
   determining that the second user requested more information about a first real-world product associated with a first AR item; and
   in response to determining that the second user requested more information, generating for display on the client device of the second user a full-screen view of the real-world product, wherein the client device of the first user continues to display the shared AR shopping experience while the full-screen view is presented to the second user.

9. The method of claim 1, further comprising:
   determining that the client devices of the first and second users are within a threshold proximity of each other; and in response to determining that the client devices of the first and second users are within the threshold proximity of each other, generating, for display on the respective client devices of the first and second users, the shared AR shopping experience.

10. The method of claim 1, further comprising:
generating for display, within the shared AR shopping experience on the client devices of the first and second users, a virtual mannequin;
applying a first article of clothing to the virtual mannequin based on a first input that is received from the client device of the second user that selects a first AR item; and
applying a second article of clothing to the virtual mannequin based on a second input that is received from the client device of the first user that selects a second AR item, the first and second articles of clothing being presented on the mannequin together.

11. The method of claim 1, further comprising:
reducing a quantity of a plurality of AR items displayed on the client device of the second user in response to receiving selection of a first AR item from the client device of the first user.

12. The method of claim 10, further comprising:
accessing an inventory of a store represented by the shared AR shopping experience;
determining that a first real-world item associated with the first AR item is a last item available in the inventory of the store; and
removing a representation of the first AR item from the display of the shared AR shopping experience on the client device of the second user in response to determining that the first real-world item is the last item available in the inventory of the store.

13. The method of claim 1, further comprising:
accessing an inventory of a store represented by the shared AR shopping experience; and
modifying a quantity of a plurality of AR items represented in the display of the shared AR shopping experience based on the inventory of the store.

14. The method of claim 12, further comprising:
associating a non-fungible token (NFT) with each of a plurality of AR items to track availability of real-world products represented by the plurality of AR items.

15. The method of claim 1, further comprising capturing an image of a barcode that is associated with the shared AR shopping experience.

16. The method of claim 1, further comprising:
generating, for display on the client device of the second user, a message that identifies the first user that is currently using the shared AR shopping experience, wherein the message includes an avatar of the first users and an identifier of a store associated with real-world products.

17. The method of claim 1, further comprising:
receiving one or more images of a real-world environment from the client device of the second user;
identifying a real-world object in the one or more images; and
selecting a given AR item from a plurality of AR items for display on the identified real-world object.

18. The method of claim 17, further comprising:
receiving input from the client device of the second user that selects the given AR item from the plurality of AR items; and
causing the given AR item to be displayed on the identified real-world object depicted in an image of the real-world object depicted on the client devices of the first and second users.

19. A system comprising:
a processor configured to perform operations comprising:
determining that one or more images captured by a client device of a second user includes a depiction of a person, the client device being engaged in a shared augmented reality (AR) shopping experience with a client device of a first user;
determining that an identity of the person fails to match any of a plurality of identities of users engaged in the shared AR shopping experience; and
in response to determining that the identity of the person fails to match any of the plurality of identities of the users engaged in the shared AR shopping experience, occluding the depiction of the person in the one or more images displayed on the client device of the second user.

20. A non-transitory machine-readable storage medium that includes instructions that, when executed by one or more processors of a machine, cause the machine to perform operations comprising:
determining that one or more images captured by a client device of a second user includes a depiction of a person, the client device being engaged in a shared augmented reality (AR) shopping experience with a client device of a first user;
determining that an identity of the person fails to match any of a plurality of identities of users engaged in the shared AR shopping experience; and
in response to determining that the identity of the person fails to match any of the plurality of identities of the users engaged in the shared AR shopping experience, occluding the depiction of the person in the one or more images displayed on the client device of the second user.

* * * * *